(12) United States Patent
Kurosu et al.

(10) Patent No.: US 8,352,650 B2
(45) Date of Patent: Jan. 8, 2013

(54) ELECTRONIC APPARATUS AND COOLING METHOD THEREOF

(75) Inventors: Shigeru Kurosu, Tokyo (JP); Katsunori Kitaru, Chiba (JP); Takayuki Momose, Tokyo (JP); Akira Inoue, Tokyo (JP); Sumio Otsuka, Tokyo (JP); Masazumi Kaino, Saitama (JP); Masao Araya, Kanagawa (JP); Norio Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 811 days.

(21) Appl. No.: 11/851,012

(22) Filed: Sep. 6, 2007

(65) Prior Publication Data

US 2008/0080132 A1 Apr. 3, 2008

(30) Foreign Application Priority Data

Oct. 2, 2006 (JP) ................. 2006-270254

(51) Int. Cl.
*G06F 13/00* (2006.01)
*G01F 1/20* (2006.01)

(52) U.S. Cl. ....... 710/62; 710/2; 361/679.4; 361/679.46

(58) Field of Classification Search .............. None
See application file for complete search history.

(56) References Cited

U.S. PATENT DOCUMENTS

| | | | | |
|---|---|---|---|---|
| 5,530,878 A | * | 6/1996 | Bauer et al. | 713/310 |
| 5,691,883 A | * | 11/1997 | Nelson | 361/697 |
| 5,860,291 A | * | 1/1999 | Johnson et al. | 62/259.2 |
| 5,925,130 A | * | 7/1999 | Frame et al. | 713/300 |
| 6,141,213 A | * | 10/2000 | Antonuccio et al. | 361/679.48 |
| 6,542,362 B2 | * | 4/2003 | Lajara et al. | 361/679.48 |
| 6,723,915 B2 | * | 4/2004 | Radu et al. | 174/359 |
| 7,134,027 B2 | | 11/2006 | Calhoon | |
| 7,370,218 B2 | * | 5/2008 | Lee | 713/320 |
| 2002/0059494 A1 | | 5/2002 | Kondo | |
| 2004/0143768 A1 | | 7/2004 | Calhoon | |
| 2005/0267676 A1 | | 12/2005 | Nezu et al. | |
| 2006/0070527 A1 | * | 4/2006 | Chapman et al. | 96/417 |
| 2006/0119595 A1 | * | 6/2006 | Hsuan et al. | 345/211 |
| 2007/0211430 A1 | * | 9/2007 | Bechtolsheim | 361/695 |

FOREIGN PATENT DOCUMENTS

| | | |
|---|---|---|
| CN | 1517831 A | 8/2004 |
| CN | 1549103 A | 11/2004 |
| CN | 1704886 A | 12/2005 |
| CN | 2746437 Y | 12/2005 |
| CN | 2762204 Y | 3/2006 |
| JP | 2003-29885 | 1/2003 |

\* cited by examiner

*Primary Examiner* — Ilwoo Park
(74) *Attorney, Agent, or Firm* — Oblon, Spivak, McClelland, Maier & Neustadt, L.L.P.

(57) ABSTRACT

An electronic apparatus includes a first unit having a first power switch for turning on/off a data processing part, a hard disk drive device, a power supply part and the electronic apparatus, a second unit that is separated from the first unit, is supplied with the power from the power supply part in the first unit, and has a drive device of a detachable recording media and a second power switch having the same function as that of the first power switch, and a cable for communicating data between the first unit and the second unit and supplying power from the power supply part of the first unit to the second unit.

16 Claims, 8 Drawing Sheets

ELECTRONIC APPARATUS AND COOLING METHOD THEREOF

BACKGROUND OF THE INVENTION

1. Field of the Invention

The present invention relates to an electronic apparatus having a data processing part and a data recording part, which is represented, for example, by a PC, and a method for cooling the inside of the electronic apparatus.

2. Description of Related Art

While a hard disk drive device has been mainly used as means for storing data for PCs, a removable recording medium such as a Compact Disc (CD), Digital Video Disc (DVD), and portable type flash memory card has been widely used in recent years.

Generally, in order to make the removable recording medium usable, a drive device for the medium is often built in the PC. Particularly, recent PCs are equipped with two optical type drive devices, and further may be equipped with drive devices supporting various types of portable flash memory cards.

When the above-described plurality of drive devices are incorporated into PCs under some limitation in size of units, the inside of the PC is integrated, and thus it is difficult to freely design space inside the PCs, which considerably limits the arrangement of devices.

On the other hand, as processing speeds of PCs become high, a heating value also becomes very high, and thus efficient cooling is required. However, the above-described limitation in arrangement of the devices in the PC makes a design for efficient cooling very difficult.

Consequently, for example, it is conceivable to employ so-called external drive devices, which are attached externally to the PC. This can reduce the devices inside the PCs in number to allow more free arrangement of the devices in the PCs, and thereby enabling the design for efficient cooling (for example, refer to Japanese Patent Application Publication No. JP2003-029885 (FIGS. 1 to 3), Patent Document 1).

SUMMARY OF THE INVENTION

However, in a case where the plurality of drive devices are attached externally, there arises an issue in which the wiring between the PC and the respective drive devices, and the wiring for power supply to the respective drive devices become very complicated.

Moreover, the PC unit is often placed in a position far from a user, for example, under a desk from the following reasons: in a so-called desktop type PC, the frequency of user access to the PC unit is lower than the frequency of user access to the respective drive devices, and a housing of the PC unit is typically large. These arise problems of disadvantageous access to the PC unit, and very inconvenient on/off operation of a power switch of the PC.

In light of the above-described situations, it is desirable to provide an electronic apparatus which allow freer arrangement of devices therein to perform efficient cooling, easy on/off operation of a power switch of the apparatus, and simple wiring, and to provide a cooling method of the electronic apparatus.

An electronic apparatus according to an embodiment of the present invention includes: a first unit having a first power switch for turning on/off a data processing part, hard disk drive devices, a power supply part and the electronic apparatus; a second unit separated from the first unit, to which the power is supplied from the power supply part in the first unit, and has drive devices of removable recording media and a second power switch of the same function as that of the first power switch; and a cable for communicating data between the first unit and second unit and supplying the power from the power supply part of the first unit to the second unit.

According to the embodiment of the present invention, the electronic apparatus is separated into the first unit and the second unit. In the first unit, the devices having a high heating value with low user access are arranged, while in the second unit the drive devices of the removable recording media having a low heating value with high user access are arranged. Additionally, the power switches are provided in both of the first and second units. Therefore, the devices in the apparatus will be arranged more freely to enable efficient cooling, and to enable easy on/off operation of the power supply switch of the apparatus. Moreover, the second unit is supplied with the power from the power supply part of the first unit. For example, the data communication between the first unit and the second unit, and the power supply from the power supply part in the first unit to the second unit are performed by using one cable, and thus the wiring may be simplified.

The electronic apparatus of the embodiment may be modified so that the first unit is separated into a first region where the data processing part is mounted, and a second region where the hard disk drive devices and the power supply part are mounted.

In the embodiment of the present invention, the separation of the first unit into the first region and the second region enables separate cooling control for each region, to enable more efficient cooling.

According to the embodiment of the present invention, the first power switch is provided on a first surface of the first unit, and the hard disk drive devices can be attached and detached from the first surface side.

In the embodiment of the present invention, the user can easily attach and detach the hard disk drive through a surface most frequently accessed by him/her, that is, a surface having the switch provided.

According to the embodiment of the present invention, the second region may have a case having a lid detachable from the first surface side and housing a plurality of the hard disk drive devices, and the power supply part arranged between the case and a second surface opposite of the first surface of the first unit. The first region and the second region are shielded by a member of the case on a boundary with the first region and a shielding member arranged between the power supply part and the first region.

In the embodiment of the present invention, since the first region and the second region are shielded by the shielding member, the first region and the second region are less affected thermally with each other, and the temperature control or cooling control in the respective regions may be performed more punctiliously.

According to the embodiment of the present invention, in the first region, at least one first cooling fan is arranged on the first surface side, and exhaust holes are provided on the second surface side. In the second region, a second cooling fan is arranged in the power supply part to exhaust air or gas from the second surface side and take air in from the first surface side of the case.

In the embodiment of the present invention, the first region and the second region are cooled by different fans respectively to enable more scrupulous temperature control. Particularly, in the second region, since the second cooling fan is arranged in the power supply part having a high heating value, the cooling can be performed more efficiently.

The electronic apparatus according to the embodiment of the present invention may further include first temperature detecting means for detecting a temperature of the first region, second temperature detecting means for detecting a temperature of the second region, and control means for controlling the number of rotations of the first and second fans based on detection results by the first and second temperature detecting means.

In the embodiment of the present invention, the temperatures in the respective regions are detected separately, and the rotation numbers of the fans in the respective regions are controlled based on the detection results, therefore more efficient and scrupulous cooling control may be performed.

In the embodiment of the present invention, extension boards may be arranged in a third region in the first region, adjacent to the power supply part, and a plurality of holes are provided on the shielding member such that the gas sucked from the first fan passes through the third region and is exhausted by the second fan arranged in the power supply part in the second region.

In an embodiment of the present invention, since the cooling gas is arranged to flow on the extension board side, the extension boards can also be cooled more efficiently.

According to the embodiment of the present invention, the first fan has a fan for sending the cooling gas mainly to the data control part, and a fan for sending the cooling gas mainly to the third region.

In the embodiment of the present invention, since the additional fan is provided separately in the third region where the extension boards are arranged, the extension boards can be cooled more efficiently, and further, as a whole, more scrupulous cooling control can be performed.

In an embodiment of the present invention, on a third surface of the second unit, an interface part for taking in and out the recording media of the drive devices and the second power switch are arranged.

In the embodiment of the present invention, since the loading/unloading of the recording media and the power-on/off can be performed through the same surface in the second unit, the operability is very high.

An electronic apparatus according to another embodiment of the present invention includes a first region where a data processing part is mounted, a second region where hard disk drive devices and a power supply part are mounted, a shielding member that partitions the first region and the second region, first cooling means for cooling the first region, and second cooling means for cooling the second region.

In the embodiment of the present invention, dividing and partitioning of two regions by the shielding member to cool each region separately may enable more efficient and precise cooling control.

The electronic apparatus according to the embodiment of the present invention may further include first temperature detecting means for detecting a temperature of the first region, second temperature detecting means for detecting a temperature of the second region, and control means for controlling cooling capacity of the first and second cooling means depending on detection results by the first and second temperature detecting means.

In an embodiment of the present invention, since the temperatures in the respective regions are detected separately, and the cooling capacity of the respective regions is controlled on the basis of these detection results, more efficient and scrupulous cooling control can be performed.

A cooling method of an electronic apparatus according to still another embodiment of the present invention, includes steps of separating the electronic apparatus into a first unit having a data processing part, hard disk drive devices and a power supply part, and a second unit having drive devices of detachable recording media, separating and shielding the first unit into a first region where the data processing part is mounted and a second region where the hard disk drive devices and the power supply part are mounted, and controlling cooling of the first region and the second region respectively.

In the embodiment of the present invention, since the electronic apparatus is divided into the two regions, and these regions are shielded from each other by the shielding member to be cooled separately, more efficient and precise cooling control can be performed.

DETAILED DESCRIPTION OF THE EMBODIMENT

Hereinafter, an embodiment of the present invention is described in reference to the drawings.

Figure 1:
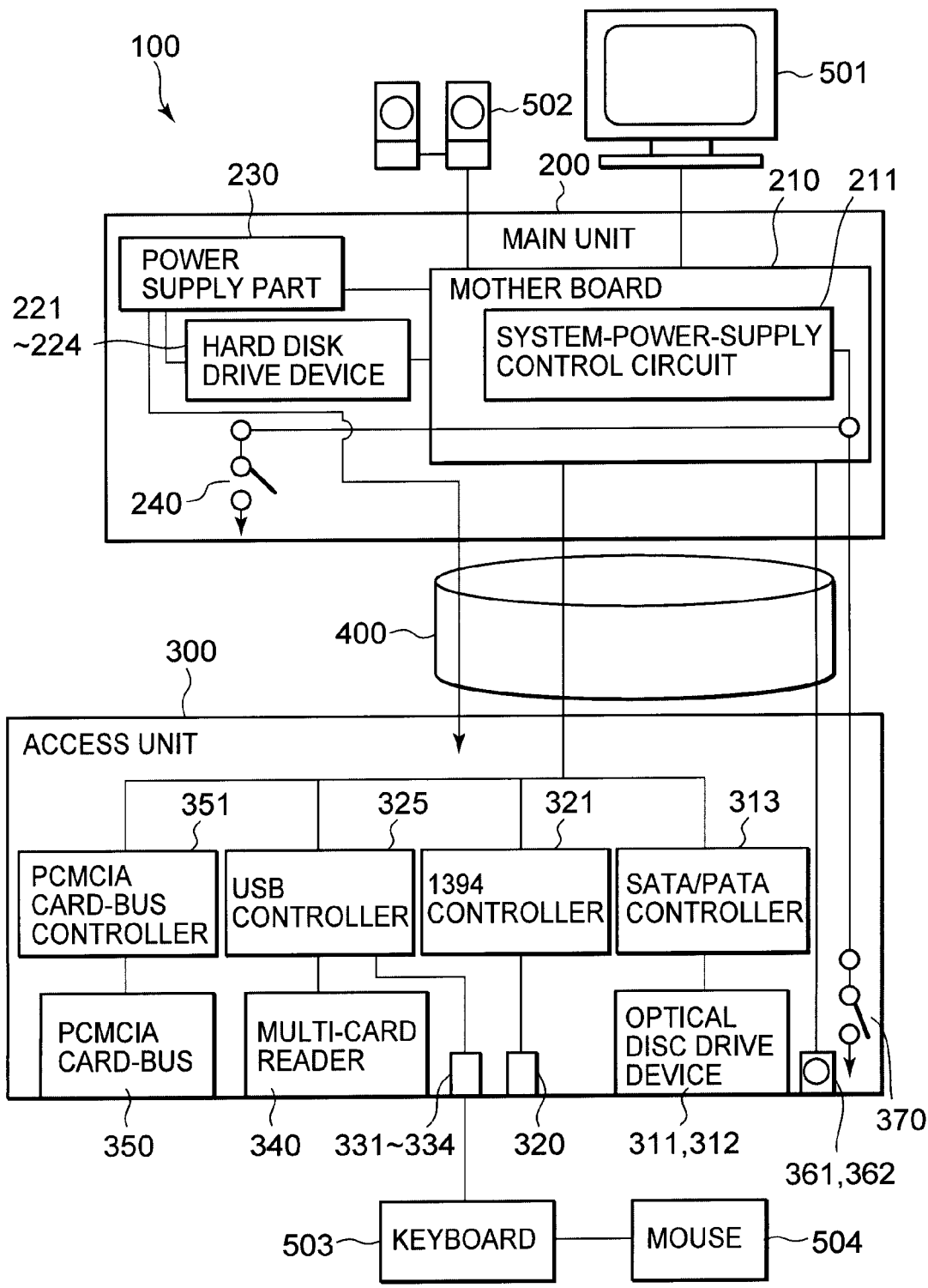
FIG. 1 is a block diagram showing a configuration of a PC according to one embodiment of the present invention.

FIG. 1 is a block diagram showing a configuration of a PC according to one embodiment of the present invention.

As shown in FIG. 1, a PC 100 has a main unit 200 as a first unit, an access unit 300 as a second unit, and a cable 400 for connecting these main unit 200 and access unit 300. In this PC 100, the main unit 200 and the access unit 300 are physically separated, and are electrically connected with the cable 400 in between.

The main unit 200 has a mother board 210 as a data processing part where a CPU or the like are mounted, hard disk drive devices 221 to 224, (mainly four devices, although not shown), a power supply part 230 for supplying power to respective parts forming the PC 100, and a first power switch 240 for putting the PC 100 into on/off/standby mode.

The mother board 210 has a system-power-supply control circuit 211 for giving identical functions to the first power switch 240 and a second power switch on the access unit 300 side, which will be described later, that is, for making the second power switch function as a power switch for putting the PC 100 into the on/off/standby mode.

The power supply part 230 supplies the power not only to the respective parts of the main unit 200 but also to respective parts of the access unit 300 via the cable 400.

The access unit 300 has optical disc drive devices 311, 312 (two devices although not shown) as drive devices on/from which an optical recording medium such as a CD and a DVD is removable for reading data from an optical recording medium and writing data into an optical recording medium, an IEEE 1394 port 320, USB ports 331 to 334 (four ports although not shown), a multi-card reader 340 (one of the drive devices) for reading data from various types of portable flash memory cards and writing data into flash memory cards, a PCMCIA card bus 350 (one of the drive devices) for reading data from a PCMCIA card and writing data into a PCMCIA card, a microphone terminal 361 and a headphone terminal 362, and a second power switch 370 for putting the PC 100 into the on/off/standby mode.

The optical disc drive devices 311, 312, the IEEE1394 port 320, the USB ports 331 to 334 and the multi-card reader 340, and the PCMCIA card 350 are connected to the mother board 210 of the main unit 200 through an SATA/PATA controller 313, through a 1394 controller 321, a USB controller 325, and a PCMCIA card bus controller 351, respectively.

A monitor 501 and a speaker 502 are connected to the main unit 200, and a keyboard 503 and a mouse 504 can be connected to either of the main unit 200 and the access unit 300 through the USB ports 331 to 334.

Figure 2:
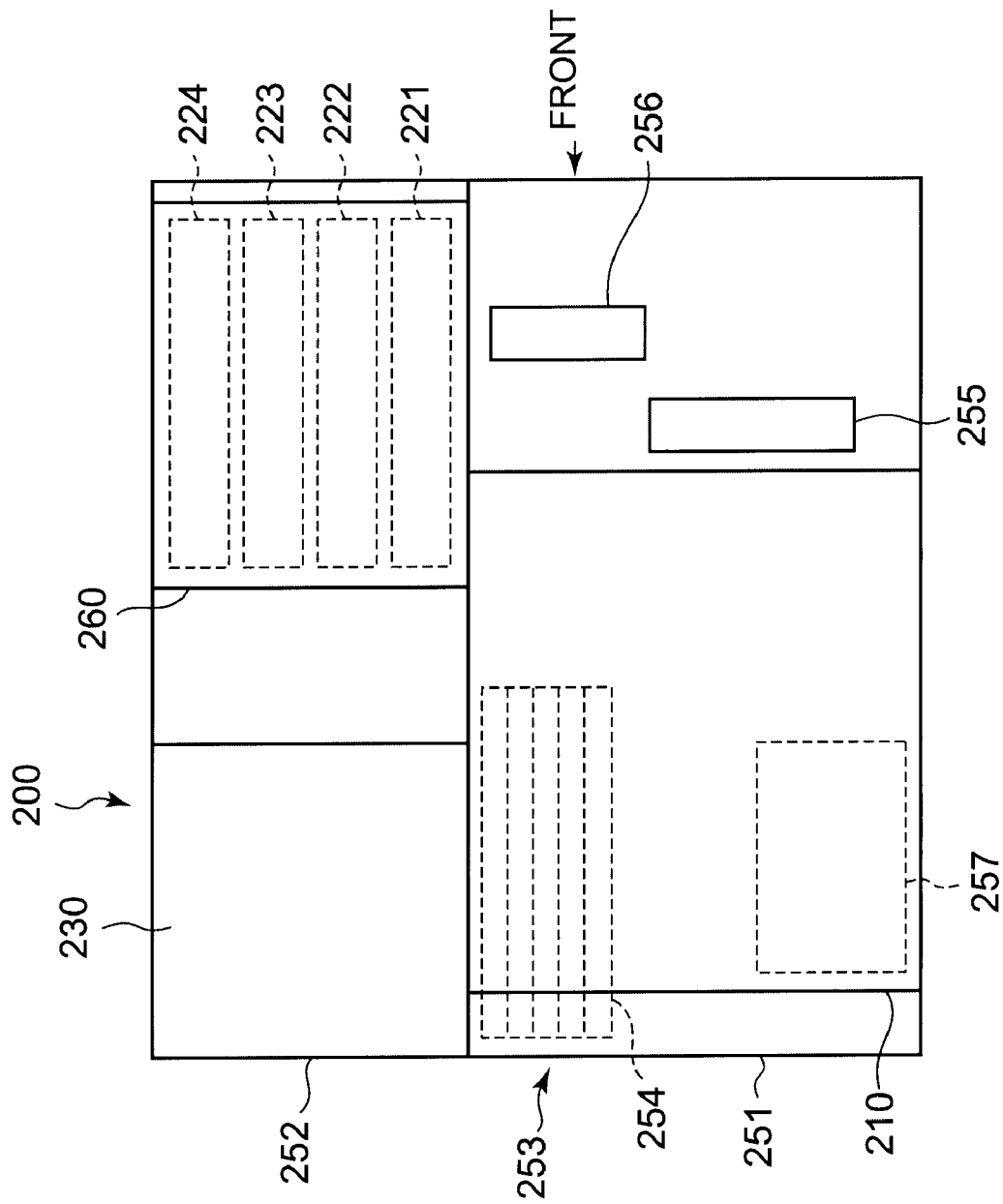
FIG. 2 is a plane view showing an internal configuration of a main unit shown in FIG. 1.
Figure 3:
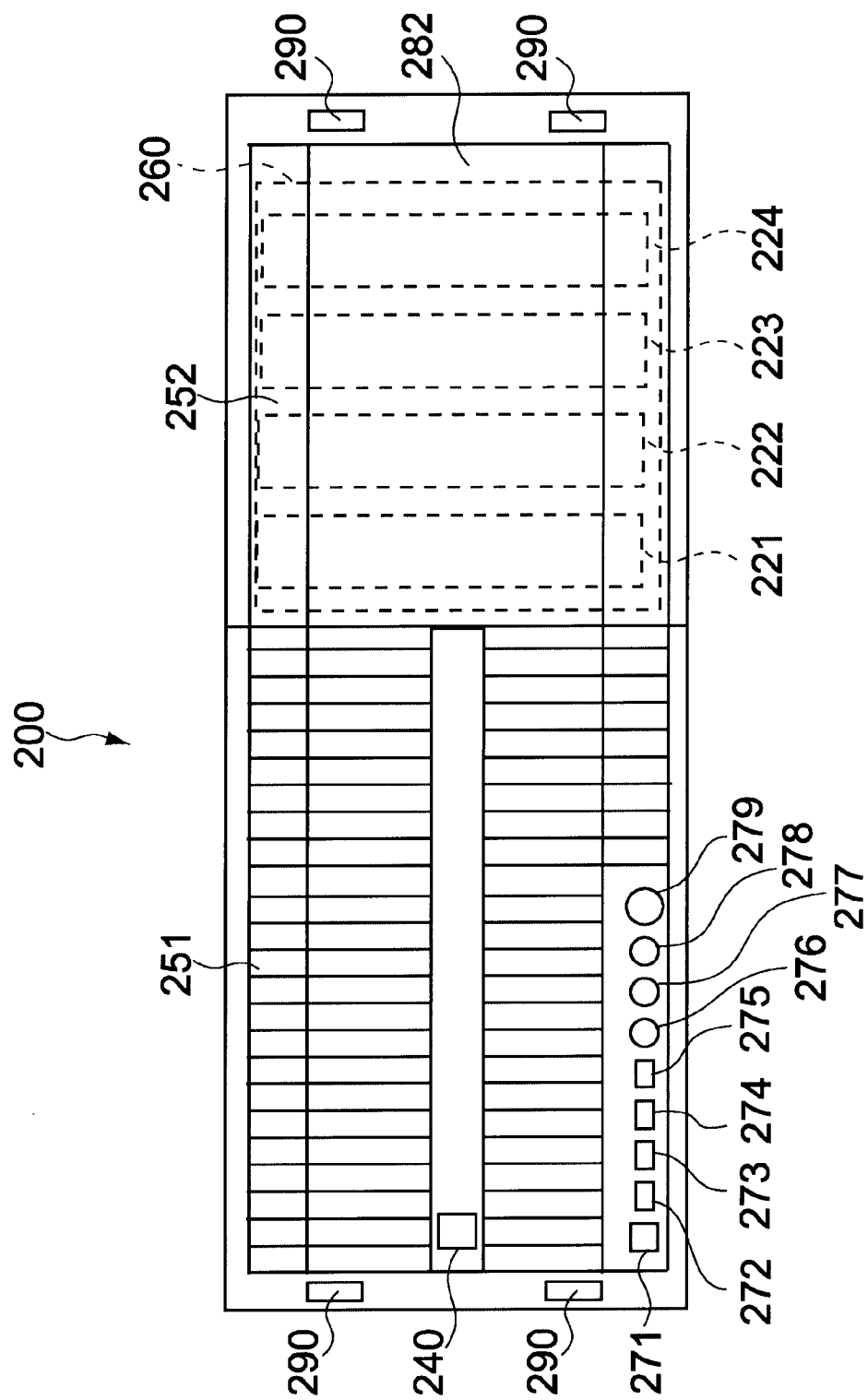
FIG. 3 is a front view of the main unit shown in FIG. 1.

FIG. 2 is a plane view showing an internal configuration of the main unit 200 shown in FIG. 1, and FIG. 3 is a front view of the main unit 200.

As shown in FIG. 2, the main unit 200 is divided into right and left regions when viewed from the front. In this case, the left region when viewed from the front face of the main unit 200 is a first region 251, and the right region when viewed from the front face of the main unit 200 is a second region 252.

In the first region 251, the mother board 210 is arranged in a bottom portion thereof, and in a region 253 adjacent to the power supply part 230 of the second region 252, up to four extension boards 254 may be arranged. The extension boards 254 are fitted into sockets for extension board (not shown) on the mother board 210 to be arranged upright from the mother board 210. An interface plane of the extension boards with the outside is exposed on the rear face side of the main unit 200.

On the front face side of the first region 251, two cooling fans 255, 256 are arranged. The fan 255 is a fan for mainly cooling the mother board 210, while the fan 256 is a fan for mainly cooling the extension boards 254. In this embodiment, the fan 255 is larger than the fan 256, such that cooling capacity to the mother board 210 mounting the CPU, which generates more heat, is made higher. The rear face side of the first region 251 is made of sheet metal provided with a number of holes (illustration is omitted), and these holes substantially function as exhaust holes of the first region 251.

In an upper portion on a rear-face-side left-corner of the first region 251, two hard disk drive devices 257 can be mounted in such a manner that they are suspended from the upper side and piled each other.

In the second region 252, on the front face side thereof, a case 260 housing the hard disk drive devices 221 to 224 is arranged, and on the rear face side of the second region 252, the power supply part 230 is arranged.

The case 260 has a case body 261, whose right and left, and upper and lower sides are surrounded by sheet metal provided with a plurality of holes, and whose front face side and rear face side may be opened, and a lid 262 made of sheet metal provided with a plurality of holes (substantially sucking ports in the second region 252), which is detachably provided in the opening on the front face side of the case body 261. The hard disk drive devices 221 to 224 are slid and housed in this case 260 in upright manner, and connected by harnesses (not shown). Accordingly, in this PC 100, the hard disk drive devices 221 to 224 can be attached and detached from the front face side of the main unit 200.

A cooling fan 263 is provided above the power supply part 230 arranged on the rear face side of the second region 252. The cooling fan 263 sucks gas into the power supply part 230. The gas sucked into the power supply part 230 is exhausted from the rear face side of the main unit 200.

A space where the power supply part 230 is arranged is covered with a shielding member 264 made of, for example, PET. The shielding member 264 is a member partitioning off the first region 251 and a space above the power supply part 230. The shielding member 264 is provided with a plurality of holes 265 in an upper portion of the first region 251 side and in a position corresponding to the extension boards 254 on the first region 251 side. These holes 265 are provided for the cooling fan 263 to take the gas in from the first region 251 side. This allows the extension boards 254 to be supplementarily cooled. Moreover, a hole or notch 266 for passing the harnesses (not shown) from the first region 251 side is provided in a predetermined position in a lower portion of the shielding member 264.

The first region 251 and the second region 252 are shielded from each other by the above-described wall of the case 260 on the first region 251 side and wall of the shielding member 264 on the first region 251 side. This enables separate cooling control of the first region 251 and the second region 252. That is, more scrupulous cooling control can be performed to improve the cooling efficiency, and to reduce the noise of the fans.

As shown in FIG. 3, in a lower portion on the first region 251 side of the front face of the main unit 200, an IEEE 1394 port 271, four USB ports 272 to 275, RCA terminals 276 to 278, and a S-VIDEO terminal 279 are arranged in the order of the horizontal direction, and on the left end side (opposite side of the second region 252) in a middle portion, the first power switch 240 is provided.

Figure 5:
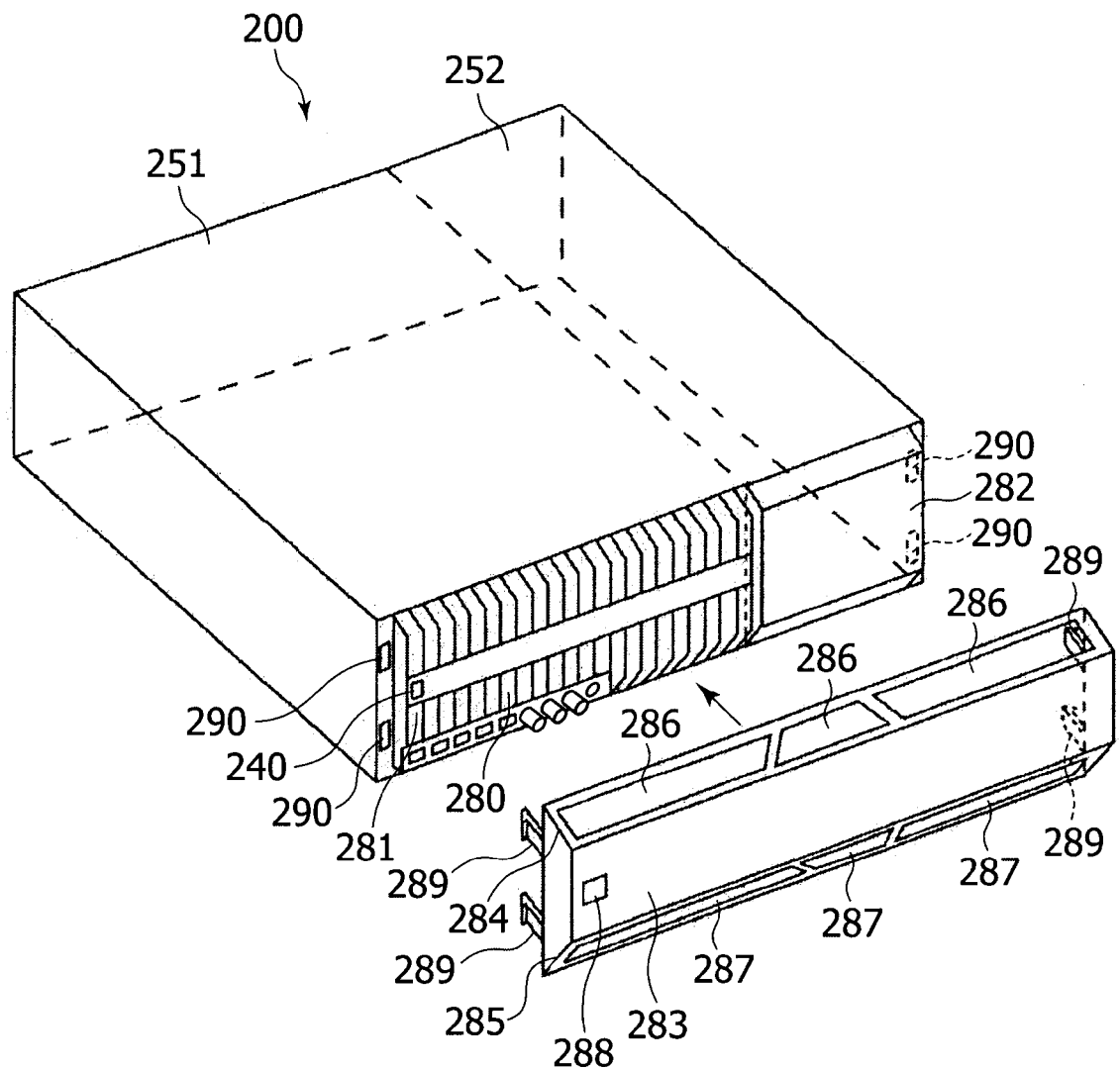
FIG. 5 is a schematic perspective view showing the outer appearance of the main unit shown in FIG. 1.

As shown in FIG. 5, at a position corresponding to the first region 251 in the front surface of the main unit 200, a plastic cover 280 provided with a number of vertical holes 281 for introducing the cooling gas inside in a vertical direction is arranged. At a portion corresponding to the second region 252 in the front surface of the main unit 200, a plastic cover 282 is detachably arranged.

Figure 4:
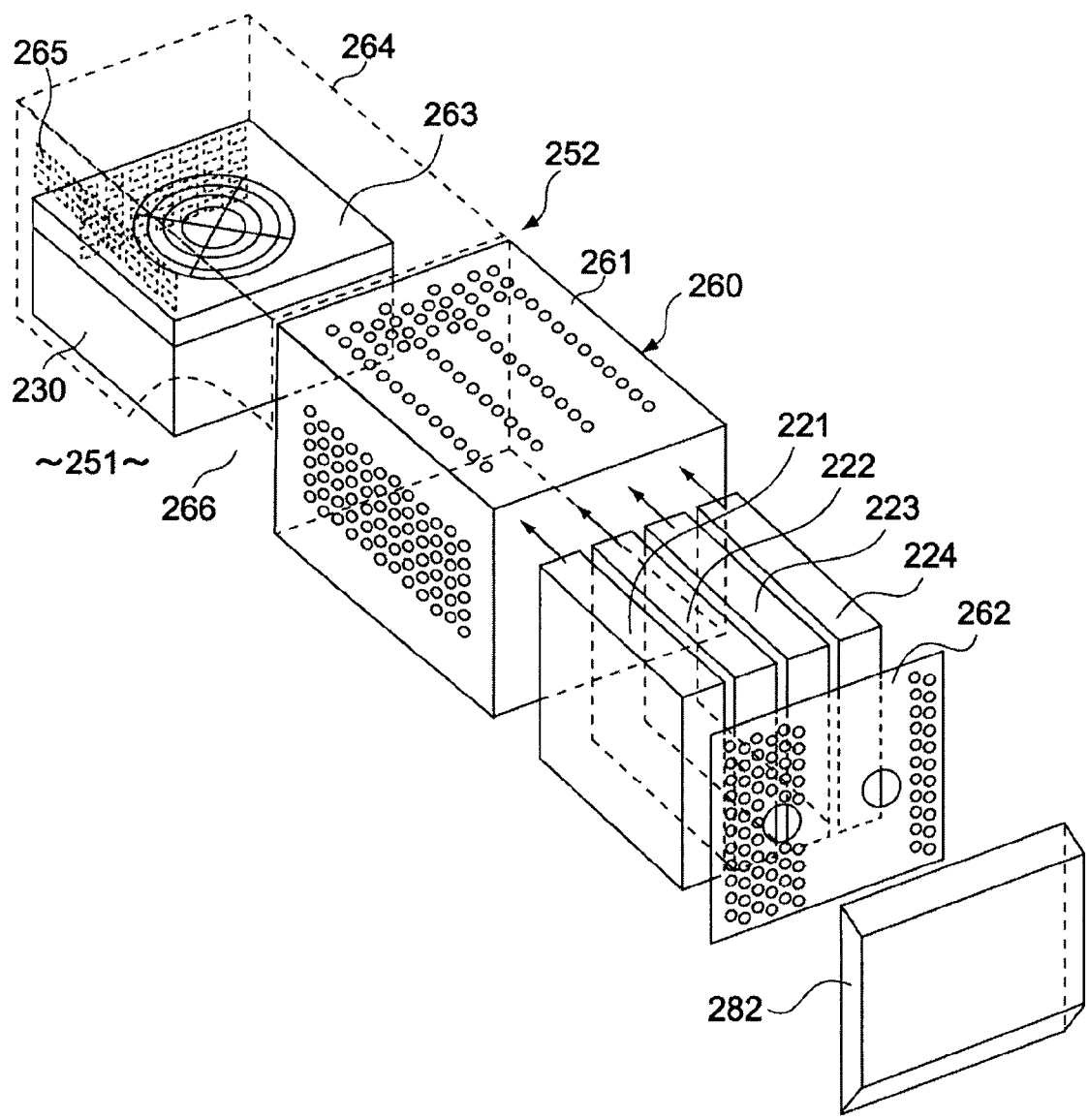
FIG. 4 is a schematic perspective view showing a configuration of a second region shown in FIGS. 2 and 3.

The cover 282 is fixed to the main unit 200, for example, by engaging projected portions (not shown) provided in upper and lower portions at a right end (on the opposite side of the first region 251) on a back surface of the cover 282 with holes (not shown) provided in corresponding positions of the main unit 200, and projecting a slide switch (not shown) provided in a position of the cover 280 adjacent to the cover 282 to the cover 282 side. By removing the cover 282 and removing the lid 262 as shown in FIG. 4, the hard disk drive devices 221 to 224 can be taken in and out from the front face of the main unit 200.

In the front face of the main unit 200, a cover 283 covering the whole of the front face is arranged detachably. The cover 283 is fixed to the main unit 200 by engaging projected portions provided in upper and lower portions on the right and left of a back surface of the cover 283 with holes provided in corresponding positions of the main unit 200.

The cover 283 has inclined surfaces 284, 285 in upper and lower portions thereof, and in the each of inclined surfaces 284, 285, three openings 286 and 287 are provided respectively for allowing access to the IEEE 1394 port 271, USB ports 272 to 275, RCA terminals 276 to 278, and S-VIDEO terminal 279 and for allowing gas circulation.

In a position of the cover 283 corresponding to the first power switch 240, a power switch 288 is provided. The power switch 288 has on the back surface of the cover 283 a projected portion (illustration is omitted) that abuts the first power switch 240, and by pressing the power switch 288, the projected portion abuts and press the first power switch 240.

Figure 6:
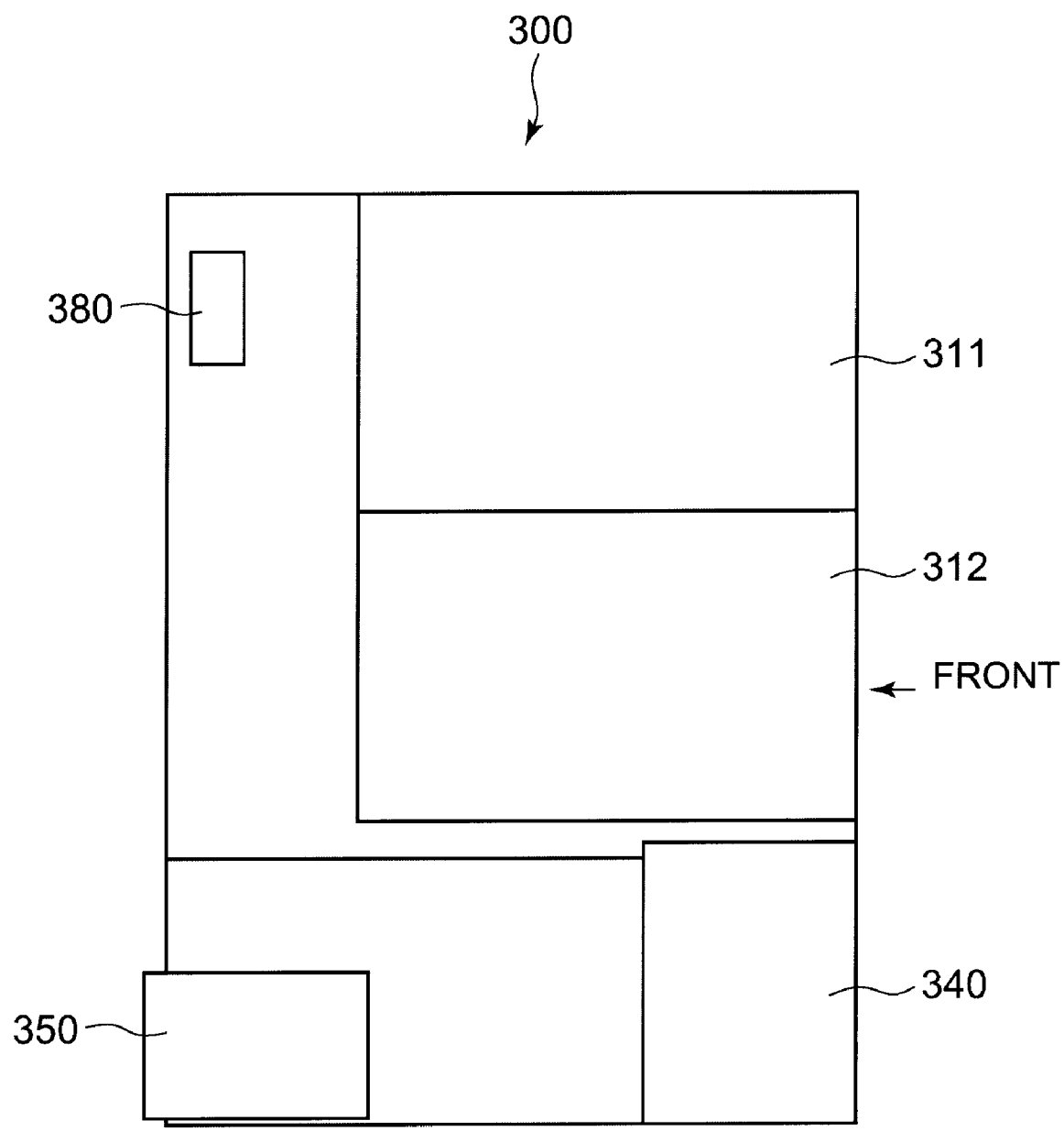
FIG. 6 is a plane view showing an internal configuration of an access unit shown in FIG. 1.
Figure 7:
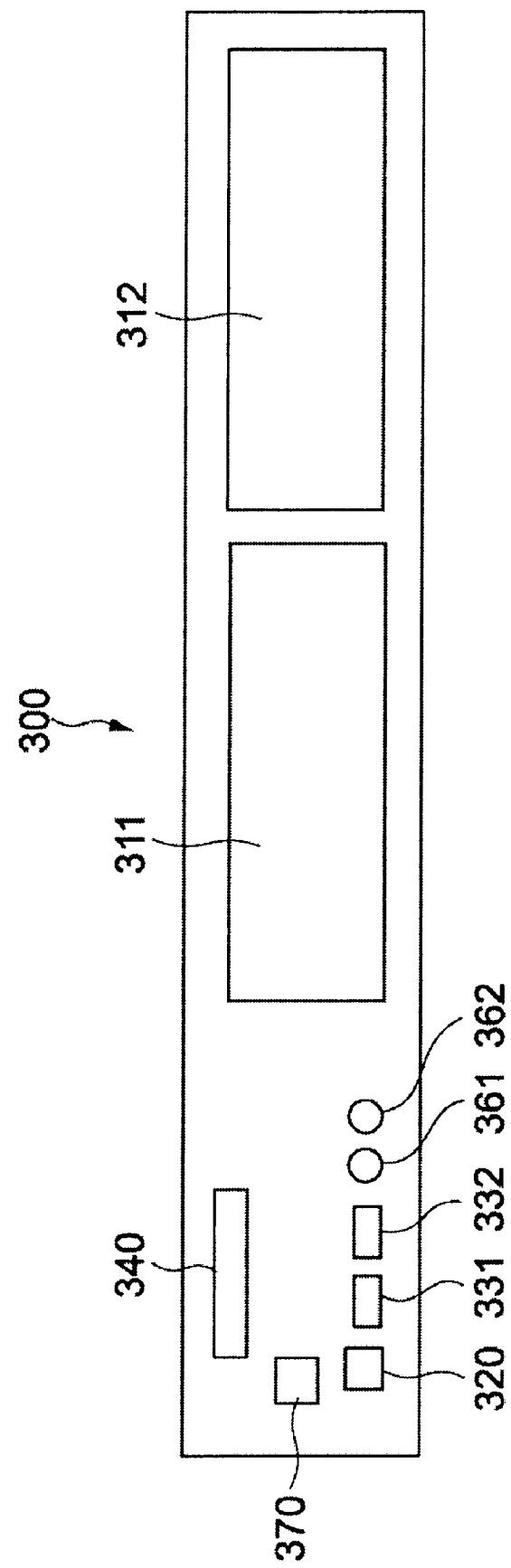
FIG. 7 is a front view of the access unit shown in FIG. 1.

FIG. 6 is a plane view showing an internal configuration of the access unit 300 shown in FIG. 1, and FIG. 7 is a front view of the access unit 300.

As shown in FIGS. 6 and 7, in the access unit 300, two optical disc drive devices 311, 312 are arranged in parallel such that recording media may be taken in and out from the front face side of the access unit 300. Obviously, hard disk drive devices may be arranged in place of these optical disc drive devices 311, 312.

An IEEE 1394 port 320, two USB ports 331, 332, a microphone terminal 361, and a headphone terminal 362 are arranged in order from the left in a lower portion of the front face of the access unit 300. Above these ports and terminals, the second power switch 370 is arranged, and further above the switch, a card insertion slot of the multi-card reader 340 is provided. A card insertion slot of the PCMCIA card bus 350 and remaining two USB ports 333, 334 are arranged in the rear face of the access unit 300. A cooling fan 380 is arranged on the rear face side inside of the access unit 300, and in a position behind the optical disc drive devices 311, 312.

The cable 400 for connecting the main unit 200 and the access unit 300 is arranged to be connected to cable connectors (not shown), provided in the rear faces of the main unit 200 and the access unit 300, respectively.

Figure 8:
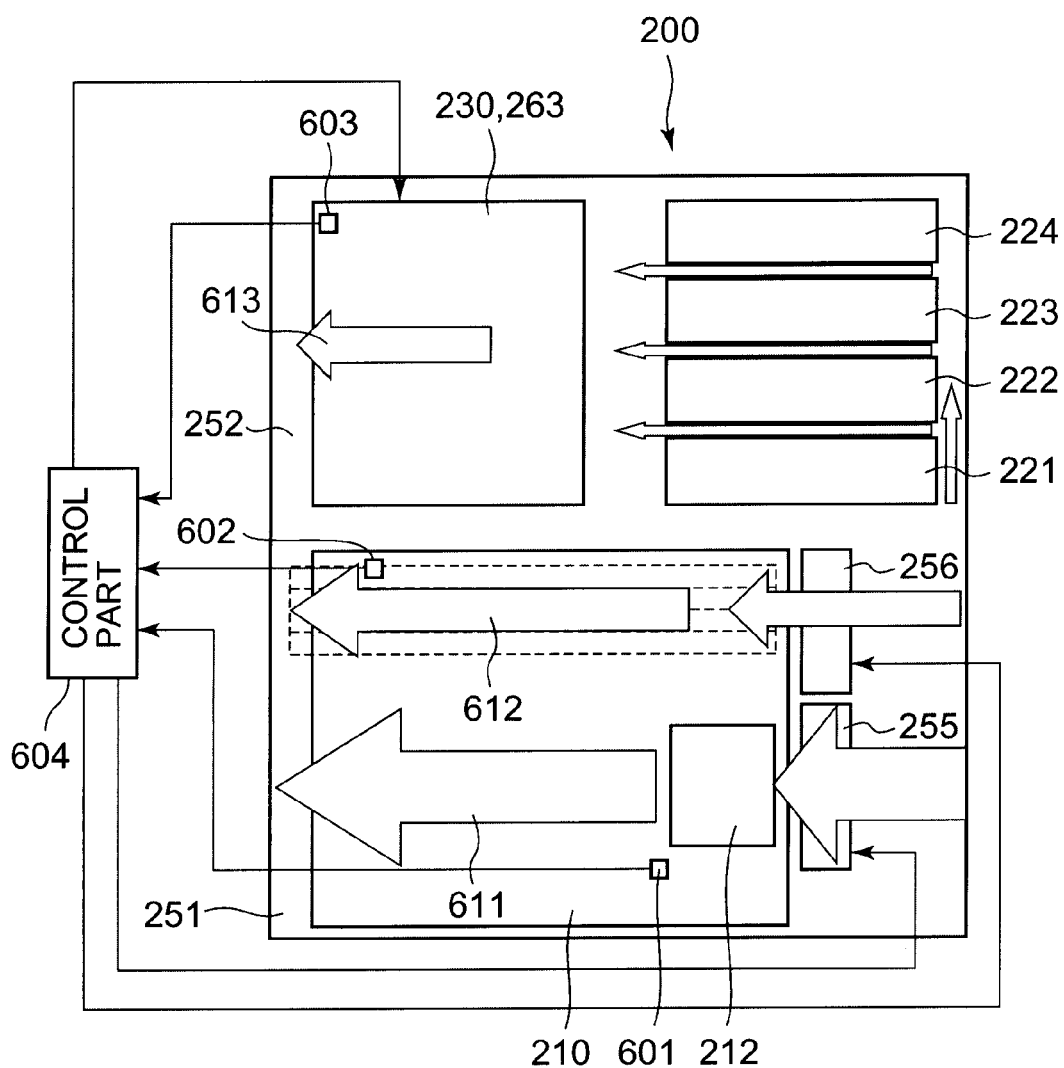
FIG. 8 is a view for explaining flows of cooling gas in the main unit shown in FIG. 1.

FIG. 8 is a conceptual plane view showing a configuration of a cooling control system of the main unit 200 and flows of the cooling gas.

A CPU 212 is arranged on the mother board 210 in the first region 251 of the main unit 200, and beside the mother board, the fan 255 is arranged. In the vicinity of this CPU 212, a temperature sensor 601 for detecting a temperature of the first region 251, particularly a temperature in the vicinity of the CPU 212, is arranged. In the vicinity of the sockets for extension board on the mother board 210, a temperature sensor 602 for detecting a temperature of the first region 251, particularly a temperature in the vicinity of the extension boards, is arranged. In the power supply part 230 in the second region 252 of the main unit 200, a temperature sensor 603 for detecting a temperature of the second region 252, particularly temperatures of the inside of the power supply part 230 and the inflow gas, is arranged.

Detection results of these temperature sensors 601 to 603 are sent to a control part 604 mainly composed of the CPU 212. Based on these detection results, the control part 604 controls the numbers of rotations of the respective fans 255, 256, 263 such that the temperatures of the respective regions 251, 252 and the like do not exceed the predetermined temperatures.

In the main unit 200, the first region 251 and the second region 252 are substantially shielded from each other, as described above, and the first region 251 and the second region 252 are cooled by using the separate fans. Further, the first region 251 is divided into two regions to be cooled separately by the two fans 255 and 256.

Accordingly, as shown in FIG. 8, mainly three flows of the cooling gas are generated inside of the main unit 200: a flow 611 of the cooling gas by the fan 255 from the front face of the main unit 200 to the rear face, through the CPU 212 in the first region 251; a flow 612 of the cooling gas by the fan 256 from the front face to the rear face of the main unit 200, though the extension boards in the first region 251; and a flow 613 of the cooling gas by the fan 263 from the front face to the rear face of the main unit 200 in the second region 252. In the second region 252, since the front face is covered with the cover 282 with no holes for circulating the gas, the gas flows from the front face side of the first region 251 to the back surface of the cover 282 (the front face side of the case 260) and flows into the second region 252.

As described above, in the PC 100 according to the present embodiment, the devices having a high heating value and hardly directly touched by a user, for example, the mother board 210 and the power supply part 230 are arranged in the main unit 200, while in the access unit 300, the drive devices of removable recording media, having a low heating value, and frequently accessed by a user, such as the optical disc drive devices 311, 312 and the multi-card reader 340 are arranged. Additionally, the power switches are provided in both of the main unit 200 and the access unit 300. Thus the devices may be arranged more freely in the PC 100 to enable efficient cooling and easy on/off operation of the power supply of the PC 100. Particularly, since it is supposed that the access unit 300 is normally arranged near the user, the provision of the power switch in the access unit 300 extremely improves the operability. In this case, free arrangement of the devices in the PC 100 means, for example, that in the main unit 200, the mother board 210 is arranged in the first region 251, and the power supply part 230 and the hard disk drive devices 221 to 224 are arranged in the second region 252, and that, for example, these regions are partitioned each other.

Moreover, in the PC 100 according to the present embodiment, the access unit 300 is supplied with the power from the power supply part 230 of the main unit 200, and data communication between the main unit 200 and the access unit 300 and the power supply from the power supply part 230 of the main unit 200 to the access unit 300 are performed by the single cable 400, therefore the wiring may be simplified. That is, in a case where the optical disc drive devices 311, 312 and the multi-card reader 340 provided in the access unit 300 are connected to the main unit 200 as the separate devices, respectively, extremely many data lines and power lines are required. In contrast, in the present embodiment, only the single cable 400 is required.

Moreover, in the PC 100 according to the present embodiment, the PC 100 is divided into two housings of the main unit 200 and the access unit 300. In the access unit 300, the functions assumed to be frequently accessed by the user are integrated, while in the main unit 200, the functions assumed to be not so frequently accessed by the user are integrated. This can realize a so-called layout free configuration, in which the access unit 300 as the one housing can be placed near the user, and the main unit 200 as the other housing can be placed farther from the user.

Furthermore, in the PC 100 according to the present embodiment, by designing the gas in the main unit 200 to flow from the front face side to the rear side, either side face of the housing of the main unit 200 can be an setting face, resulting in a layout free configuration in which the housing can be placed either vertically or horizontally.

It is noted that, the present invention is not limited to the above-described embodiment, but can be modified and carried out in various manners within the range of its technical idea.

While according to the above-described embodiment, in the main unit 200, the wall of the case 260 on the first region 251 side and the wall of the shielding member 264 on the first region 251 side are used for the shielding the first region 251 and the second region 252, a sheet of shielding member may be obviously used to shield these regions.

Moreover, while in the above-described embodiment, in the main unit 200, the three fans 255, 256, 263 are used, obviously, the number of the fans may be two, or may be four or more. Also, as the cooling means, obviously, not only fans but also other means such as a heat pipe may be used.

Furthermore, the number of rotations of the respective fans 255, 256, 263 may be controlled in response to temperatures detected by the temperature sensors arranged at the corresponding positions, or obviously, the respective temperature sensors may be weighted, and respective detection results may be reflected on the control of the rotation numbers of the respective fans 255, 256, 263.

As described above, according to an embodiment of the present invention, the devices inside the apparatus may be arranged more freely to thereby enable efficient cooling, the on/off operation of the power switch of the apparatus may be made easy, and the wiring may be simplified.

It should be understood by those skilled in the art that various modifications, combinations, sub-combinations and alterations may occur depending on design requirements and other factors insofar as they are within the scope of the appended claims or the equivalents thereof.

The present application contains subject matter related to Japanese Patent Application No. 2006-270254 filed in the Japanese Patent Office on Oct. 2, 2006, the entire content of which being incorporated herein by reference.

What is claimed is:

1. An information processing apparatus, comprising:
    a first unit having a first plurality of components including at least a motherboard on which a central processing unit (CPU) is mounted, a power supply part, a storage device, a first power switch configured to turn on and off the information processing apparatus, and a first cooling unit;
    a second unit, that is physically separated and distinct from the first unit, having a second plurality of components including at least a keyboard, a second power switch configured to turn on and off the information processing apparatus independently from the first power switch, and a second cooling unit; and
    a connecting unit configured to transfer data and power between the first unit and the second unit, wherein
    the first plurality of components included in the first unit have a higher heating value than the second plurality of components included in the second unit,
    the first cooling unit included in the first unit has a higher cooling capacity than the second cooling unit included in the second unit, and
    the second unit is configured to be arranged closer to a user of the information processing apparatus than the first unit.

2. The information processing apparatus according to claim 1, wherein the first unit further comprises:
    at least one hard disk drive device; and
    the motherboard is mounted in the first region, and at least one hard disk drive device and the power supply part are mounted in the second region.

3. The information processing apparatus according to claim 2, wherein:
    the first power switch is provided on a first surface of the first unit, and the at least one hard disk drive device is configured to attach and detach from a side of the first surface.

4. The information processing apparatus according to claim 3, wherein:
    the second region includes a case, the case including a lid detachable from the side of the first surface, and the case housing the at least one hard disk drive device,
    the power supply part is arranged between the case and a second surface of the first unit opposite to the first surface of the first unit, and
    the first region and the second region are shielded from each other by a member placed between the case and the first region, and a shielding member arranged between the power supply part and the first region.

5. The information processing apparatus according to claim 4, wherein:
    the first region includes a first cooling fan arranged on the side of the first surface, and exhaust holes provided on a side of the second surface; and
    the second region includes a second cooling fan arranged in the power supply part and configured to exhaust gas from the side of the second surface and to suck the gas from the side of the first surface.

6. The information processing apparatus according to claim 5, further comprising:
    first temperature detecting means for detecting a temperature of the first region;
    second temperature detecting means for detecting a temperature of the second region; and
    control means for controlling a number of rotations of the first and second cooling fans in response to results detected by the first and second temperature detecting means.

7. The information processing apparatus according to claim 5, further comprising:
    a third region adjacent to the power supply part in the first region configured to accept extension boards, wherein
    a plurality of holes are provided on the shielding member such that the gas sucked from the first cooling fan passes through the third region and is exhausted by the second cooling fan in a power supply part of the second region.

8. The electronic apparatus according to claim 7, wherein:
    the first cooling fan is configured to send gas to the motherboard, and a third cooling fan in the first region is configured to send gas to the third region.

9. The information processing apparatus according to claim 1, wherein:
    a surface of the second unit includes an interface part configured to allow a user to take the recording media in and out of the drive devices, and
    the second power switch is arranged on the surface of the second unit.

10. The information processing apparatus according to claim 1, wherein:
    the first unit is configured to connect to a monitor.

11. The information processing apparatus according to claim 1, wherein:
    the second unit is configured to connect to a keyboard and mouse.

12. The information processing apparatus according to claim 1, wherein:
    the first cooling unit is configured to cause cooling gas to enter the first unit on a first side of the first unit and exhaust from a second side of the first unit, and
    the cooling gas is caused to flow from a first region and into a second region at an intake side of the first unit.

13. The information processing apparatus according to claim 1, wherein:
    the second unit comprises one or more Universal Serial Bus (USB) ports.

14. The information processing apparatus according to claim 1, wherein:
    the second unit comprises a card reader.

15. The information processing apparatus according to claim 1, wherein:
    the second unit comprises a headphone terminal.

16. The information processing apparatus according to claim 1, wherein:
    the second unit comprises a storage device.

* * * * *